US011965637B2

(12) United States Patent
Yando

(10) Patent No.: US 11,965,637 B2
(45) Date of Patent: Apr. 23, 2024

(54) LIGHTING FIXTURE PENDANTS

(71) Applicant: W Schonbek LLC, Plattsburgh, NY (US)

(72) Inventor: Roslyn Yando, Brainardsville, NY (US)

(73) Assignee: W SCHONBEK LLC, Plattsburgh, NY (US)

( * ) Notice: Subject to any disclaimer, the term of this patent is extended or adjusted under 35 U.S.C. 154(b) by 0 days.

(21) Appl. No.: 18/149,906

(22) Filed: Jan. 4, 2023

(65) Prior Publication Data

US 2023/0213157 A1 Jul. 6, 2023

Related U.S. Application Data

(60) Provisional application No. 63/266,393, filed on Jan. 4, 2022.

(51) Int. Cl.
*F21S 8/06* (2006.01)
*F21V 21/112* (2006.01)

(52) U.S. Cl.
CPC ............. *F21S 8/061* (2013.01); *F21V 21/112* (2013.01)

(58) Field of Classification Search
CPC ........ F21S 8/061; F21V 21/112; F21V 5/007; F21V 5/02; F21V 5/06
USPC .......................................................... 362/147
See application file for complete search history.

(56) References Cited

U.S. PATENT DOCUMENTS

| | | | |
|---|---|---|---|
| 1,577,622 | A | 10/1925 | Shapiro |
| 3,701,897 | A | 10/1972 | Pennington et al. |
| 3,820,201 | A | 6/1974 | Burchhardt |
| 4,628,424 | A | 12/1986 | Bakalowits |
| 5,104,082 | A | 4/1992 | Bayer |
| 5,980,056 | A | 11/1999 | West |

(Continued)

FOREIGN PATENT DOCUMENTS

| | | |
|---|---|---|
| CN | 302884207 | 7/2014 |
| CN | 303952808 | 11/2016 |

(Continued)

OTHER PUBLICATIONS

Roslyn J. Yando, pending design U.S. Appl. No. 29/791,194, filed Jan. 4, 2022, entitled "Lighting Fixture".

(Continued)

*Primary Examiner* — Laura K Tso
(74) *Attorney, Agent, or Firm* — Heslin Rothenberg Farley & Mesiti P.C.

(57) ABSTRACT

A lighting fixture pendant includes, for example, a connector defining an axis between a first end and a second end, a plurality of elements having an aperture therethrough and having portions asymmetrically disposed around the aperture, at least one spacer having a passageway extending from a first end to a second end, a first element having an aperture therethrough, and a second element having an aperture therethrough. The connector extends through the apertures of the plurality of elements, the first element and the second element, and the passageway of the spacer. The first element is adjacent to the first end of the spacer and the second element is adjacent to the second end of the spacer. When the lighting fixture pendant is supported from the first end of the connector, the plurality of elements, the first element, the second element, and the spacer are vertically aligned along the axis.

29 Claims, 6 Drawing Sheets

(56) References Cited

U.S. PATENT DOCUMENTS

| | | | | |
|---|---|---|---|---|
| D503,011 | S | 3/2005 | Schonbek | |
| D503,012 | S | 3/2005 | Schonbek | |
| D504,191 | S | 4/2005 | Schonbek | |
| 6,921,186 | B1 * | 7/2005 | Viskovich | F21V 5/06 362/147 |
| D517,241 | S | 3/2006 | Schuyler et al. | |
| D517,726 | S | 3/2006 | Schuyler et al. | |
| D522,168 | S | 5/2006 | Schuyler | |
| D523,169 | S | 6/2006 | Schuyler et al. | |
| D523,579 | S | 6/2006 | Schuyler et al. | |
| D523,988 | S | 6/2006 | Schuyler et al. | |
| D523,989 | S | 6/2006 | Bayer | |
| D534,303 | S | 12/2006 | Yando et al. | |
| 7,220,027 | B2 | 5/2007 | Rugee et al. | |
| D592,789 | S | 5/2009 | Sabernig | |
| D596,781 | S | 7/2009 | Sabernig | |
| D604,886 | S | 11/2009 | Rugee | |
| D622,437 | S | 8/2010 | Crosby | |
| D624,236 | S | 9/2010 | Recore et al. | |
| D630,365 | S | 1/2011 | Sabernig | |
| D644,371 | S | 8/2011 | Orozco | |
| D655,440 | S | 3/2012 | Sabernig | |
| D657,279 | S | 4/2012 | Hsiao | |
| D657,493 | S | 4/2012 | Groves | |
| D683,494 | S | 5/2013 | Verdin | |
| D688,154 | S | 8/2013 | Stuchlik | |
| D728,410 | S | 5/2015 | Yatsugi-Kang | |
| D758,911 | S | 6/2016 | Kwon | |
| D760,618 | S | 7/2016 | Yatsugi-Kang | |
| D797,599 | S | 9/2017 | Yatsugi-Kang | |
| D810,996 | S | 2/2018 | Kiani | |
| D829,963 | S | 10/2018 | Sonneman | |
| D837,439 | S | 1/2019 | Aebi et al. | |
| D870,957 | S | 12/2019 | Yando | |
| D879,360 | S | 3/2020 | Zeng | |
| D879,368 | S | 3/2020 | Yando | |
| 10,596,962 | B1 * | 3/2020 | Darden | F21S 8/065 |
| D916,348 | S | 4/2021 | Clark | |
| D934,719 | S | 11/2021 | Yatsugi-Kang | |
| D936,891 | S | 11/2021 | MacAllen et al. | |
| D938,299 | S | 12/2021 | Yatsugi-Kang | |
| D953,923 | S | 6/2022 | Yatsugi-Kang | |
| D971,777 | S | 12/2022 | Yatsugi-Kang | |
| D983,075 | S | 4/2023 | Abdourahim | |
| D983,438 | S | 4/2023 | Li | |
| D983,697 | S | 4/2023 | Abdourahim | |
| D987,464 | S | 5/2023 | Abdourahim | |
| D990,362 | S | 6/2023 | Yatsugi-Kang | |
| D997,426 | S | 8/2023 | Browning | |
| 2004/0184285 | A1 | 9/2004 | Hoffbauer | |
| 2007/0084239 | A1 * | 4/2007 | Bayer | A44C 17/0258 63/1.11 |
| 2009/0034270 | A1 | 2/2009 | Schneider | |
| 2014/0268743 | A1 | 9/2014 | Park | |
| 2016/0245469 | A1 * | 8/2016 | Park | F21S 8/065 |
| 2017/0097143 | A1 * | 4/2017 | Kominski | F21V 17/04 |

FOREIGN PATENT DOCUMENTS

| | | |
|---|---|---|
| CN | 305930475 | 7/2020 |
| KR | 200455095 Y1 * | 8/2011 |

OTHER PUBLICATIONS

Roslyn J. Yando, pending design U.S. Appl. No. 29/791,195, filed Jan. 4, 2022, entitled “Lighting Fixture”.

Roslyn J. Yando, pending design U.S. Appl. No. 29/791,193, filed Jan. 4, 2022, entitled “Lighting Fixture”.

Roslyn J. Yando, pending U.S. Appl. No. 63/266,393, filed Jan. 4, 2022, entitled “Lighting Fixture Pendants”.

Roslyn J. Yando, pending design U.S. Appl. No. 29/791,192, filed Jan. 4, 2022, entitled “Lighting Fixture”.

“26 Pack Chandelier Crystals Replacement,” available in Amazon.com, first online Unknown, site visited Sep. 22, 2023, Internet URL: https://www.amazon.com/dp/B09YL562BK ?_ encoding=UTF8 &psc=1&ref_=cm_sw_r_cp_ud_dp_ 49PVH5MCVR59HJZQ71VC, 3 pages (Year: 2023).

“Hi-ERA Acrylic Chandelier Shades,” available in Amazon.com, first available online Oct. 14, 2022, site visited Sep. 22, 2023, Internet URL: https://www.amazon.com/dp/B0BJ73NG7Z?_encoding=UTF8&ref _=cm_sw_r_cp_ud_dp_HTET601RGXFZ10H38DNS &th=1, 2 pages, (Year: 2022).

“TPMAFF 8-Light Modern Rectangle Chandelier,” available in Amazon.com, first available online Dec. 26, 2023, site visited Oct. 10, 2023, Internet URL: https://www.amazon.com/dp/BOBR49X9T8?ref_=cm_sw_r_cp_ud_dp_Q29JACSY21DXVHCKBP&th-1, 1 page (Year 2022)

Hague Registration Dm/204295, published Nov. 29, 2019, including Lighting Design, 86 pages. Nov. 29, 2019.

Hague Registration DM/202196, published Aug. 9, 2019, including Design 11, 59 pages, Aug. 9, 2019.

* cited by examiner

LIGHTING FIXTURE PENDANTS

CROSS-REFERENCE TO RELATED APPLICATION

This application claims priority benefit of U.S. provisional patent application No. 63/266,393, filed Jan. 4, 2022, entitled "Lighting Fixture Pendants," which application is incorporated herein by reference in its entirety.

TECHNICAL FIELD

The present disclosure relates generally to ornamental fixtures, and more particularly, lighting fixture pendants for ornamental fixtures such as lighting fixtures.

BACKGROUND

Conventional lighting fixture pendants such as ornamental chains typically have one element of the chain attached to the next.

In the construction of ornamental lighting fixtures, such as chandeliers, it is common to incorporate vertical "curtains" of decorative ornaments. These curtains are typically made from "chains" of ornaments, for example, chains of suspended octagonal crystals.

SUMMARY

Shortcomings of the prior art are overcome and additional advantages are provided through the provision of a lighting fixture pendant having, for example a connector having a first end and a second end, the connector defining an axis between the first end and the second end of the connector, a plurality of elements having an aperture therethrough and having portions asymmetrically disposed around the aperture, at least one spacer having a first end and a second end, and a passageway extending from the first end to the second end of the spacer, a first element having an aperture therethrough, and a second element having an aperture therethrough. The connector extends through the apertures of the plurality of elements, the apertures of the first element and the second element, and the passageway of the spacer. The first element is proximate to the first end of the spacer and the second element is proximate to the second end of the spacer. When the lighting fixture pendant is supported from the first end of the connector, the plurality of elements, the first element, the second element, and the spacer are vertically aligned along the axis.

In another embodiment, a lighting fixture pendant includes, for example, a connector having a first end and a second end, the connector defining an axis between the first end and the second end of the connector, a plurality of elements having an aperture therethrough and having portions asymmetrically disposed around the aperture, and at least one separator having a first end and a second end, and a passageway extending from the first end to the second end of the separator. The connector extends through the apertures of the plurality of elements and the passageway of the separator, and when the lighting fixture pendant is supported from the first end of the connector, the plurality of elements and the separator are vertically aligned along the axis.

In some embodiments, the connector may be a wire or a cable, the plurality of elements may be a plurality of ornamental elements, and the at least one spacer or separator may be a symmetric spacer or separator. In some of the embodiments, the connector may be a wire or a cable, the plurality of elements or bodies may be a plurality of faceted crystals. The spacer may be a tube, the first element may be a first crystal bead and the second element may be a second crystal bead.

In other embodiments, lighting fixtures may include, for example, a gallery plate or support, a plurality of lighting fixture pendants described above supportable from the gallery plate or support, and a light source.

BRIEF DESCRIPTION OF THE DRAWINGS

The subject matter which is regarded as the disclosure is particularly pointed out and distinctly claimed in the concluding portion of the specification. The disclosure, however, may best be understood by reference to the following detailed description of various embodiments and the accompanying drawings in which:

DETAILED DESCRIPTION

The present disclosure is directed to lighting fixture pendants such as ornamental vertical chains that may be assembled into lighting fixtures. A plurality of lighting fixture pendants of the present disclosure may be assembled into one or more ornamental curtains of the lighting fixture. For example, the lighting fixture pendants may be mounted in gallery plates that suspend the ornament chains in staggered relationship either in multiple planes or within the same plane whereby the ornaments fill the gaps and voids in the visual field of the viewer. The lighting fixtures may include chandeliers and other lighting fixtures.

As will be appreciated from the present description, the lighting fixture pendants or chains may include vertical chains having asymmetrically disposed elements or portions, but in which the chains maintain a general overall vertical orientation. The asymmetric disposed portions or elements may be rotatably positionable about a vertical axis. Various separators may include spacers, such as tubes in combination with round elements or beads that allow for vertical alignment of the chain generally with the vertical axis of the lighting fixture pendant, e.g., providing a vertical self-aligning feature. The asymmetrically disposed crystals may also be positionable in different angular rotational positions relative to the axis.

Figure 1:
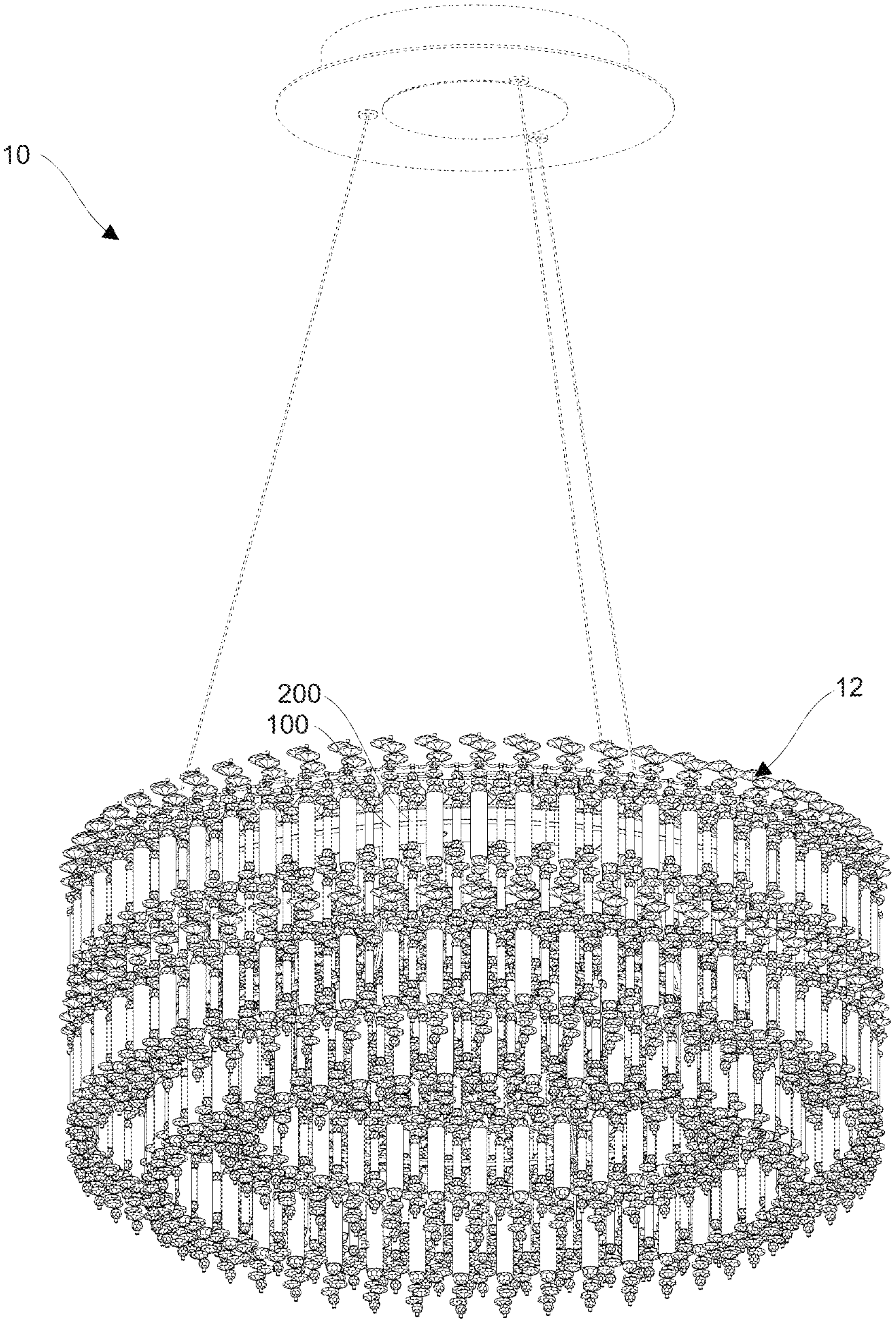
FIG. 1 is a perspective view of a round lighting fixture having a plurality of lighting fixture pendants, according to an embodiment of the present disclosure.
Figure 2:
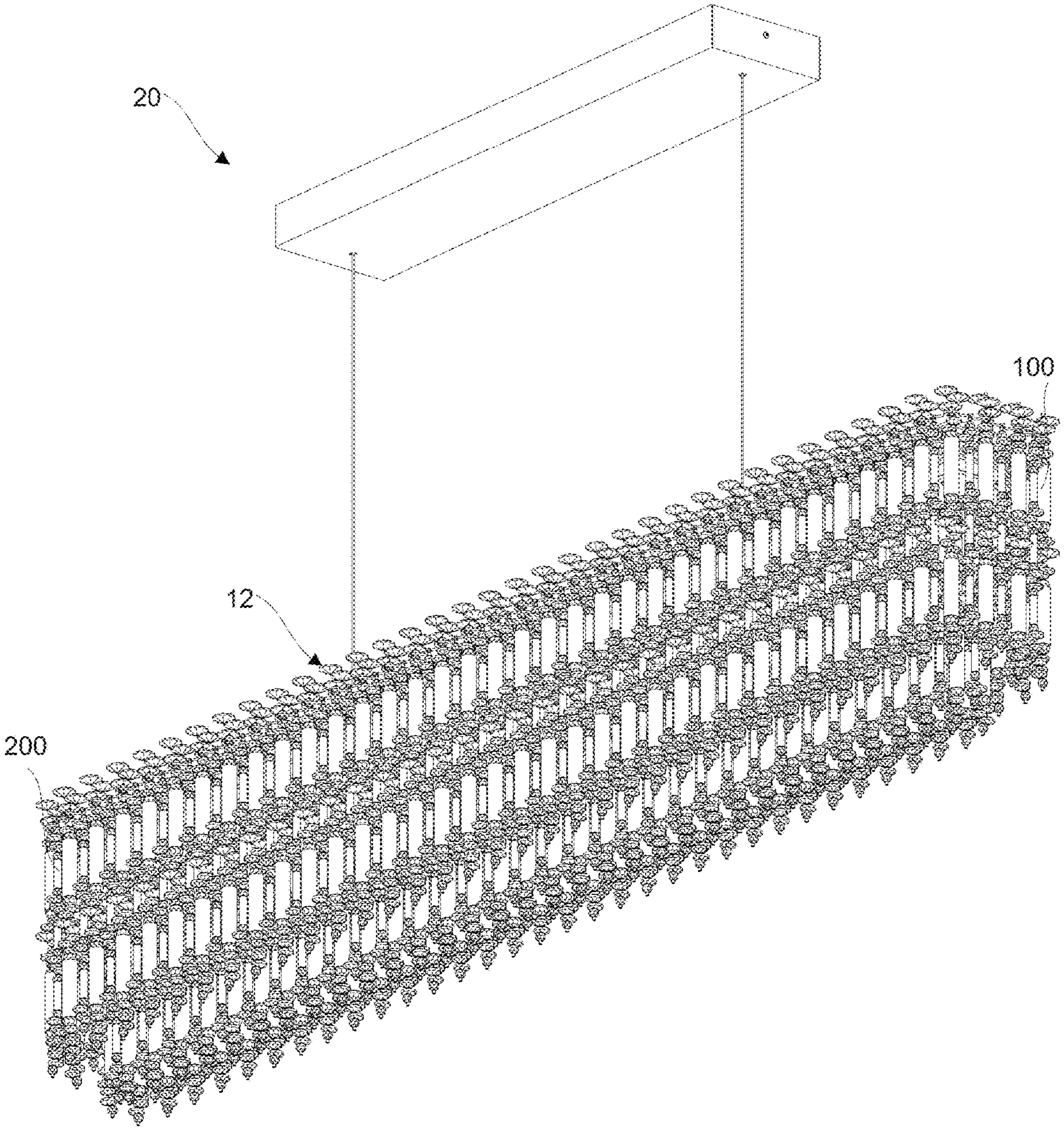
FIG. 2 is a perspective view of a rectangular lighting fixture having a plurality of lighting fixture pendants, according to an embodiment of the present disclosure.

FIG. 1 illustrates a round lighting fixture 10 having a plurality of lighting fixture pendants 12, according to an embodiment of the present disclosure. FIG. 2 illustrates a rectangular lighting fixture 20 having a plurality of lighting fixture pendants 12, according to an embodiment of the present disclosure. In this illustrated embodiments, plurality of lighting fixture pendants 12 may include a plurality of lighting fixture pendants 100 and 200. The plurality of lighting fixture pendants 12 may be disposed around a light source, and operably connected to a power supply.

Figure 3:
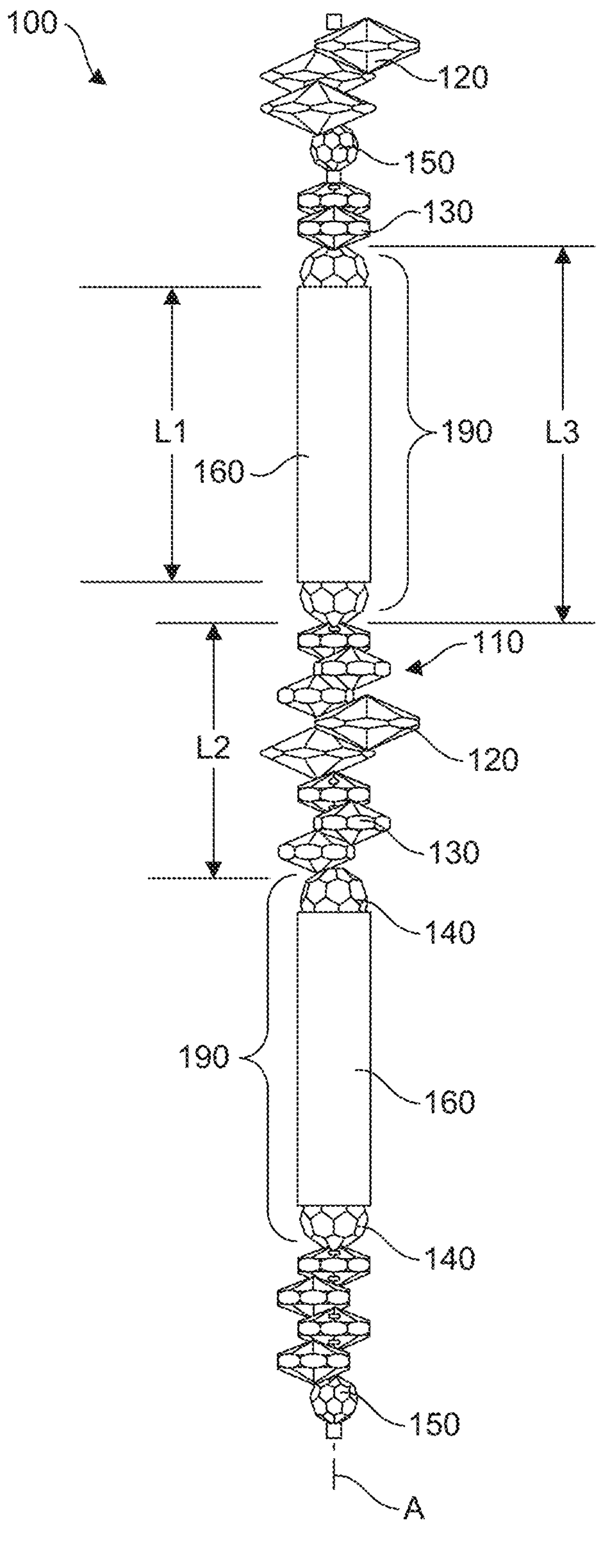
FIG. 3 is a side elevational view of a lighting fixture pendant, according to an embodiment of the present disclosure.
Figure 4:
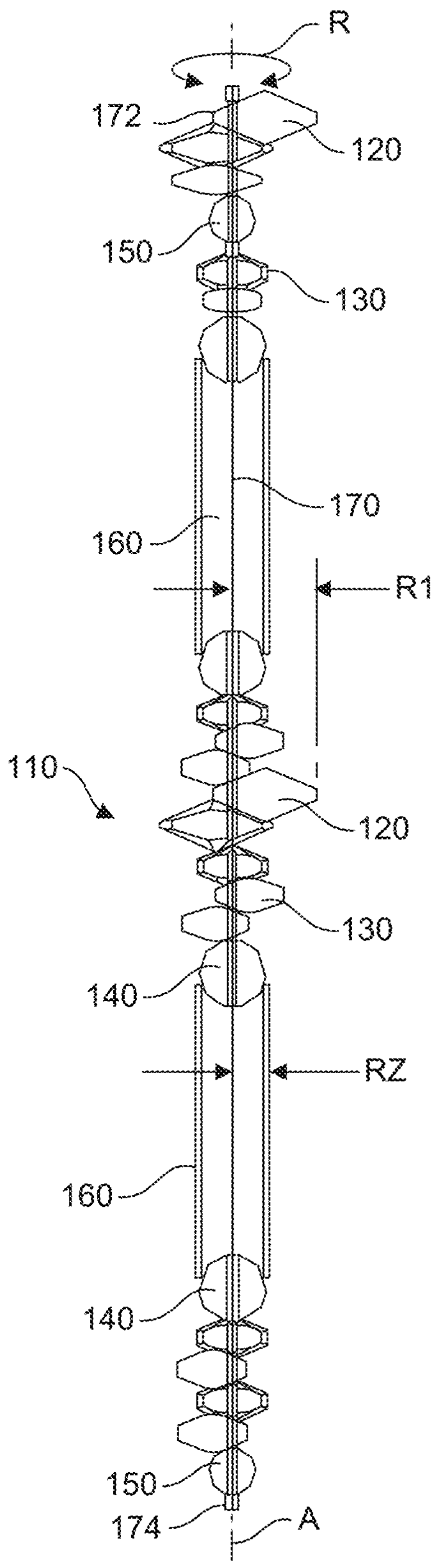
FIG. 4 is a cross-sectional view of the lighting fixture pendant of FIG. 3, according to an embodiment of the present disclosure.

As shown in FIGS. 3 and 4, lighting fixture pendant 100 may include a plurality of asymmetric disposed elements while the lighting fixture pendant 100 retains a generally vertical orientation, according to an embodiment of the present disclosure. In this illustrated embodiment, lighting fixture pendant 100 may include a plurality of ornamental or decorative elements 110 such as large octagonal-shaped faceted crystals 120 and a plurality of small octagonal-shaped faceted crystals 130. a plurality of large spherical faceted beads or bodies 140, a plurality of small spherical faceted beads 150, at least one or a plurality of separators 190, and a connector 170 (FIG. 4) such as a wire or a cable that is crimped at a first end 172 (FIG. 4) and at a second end 174 (FIG. 4).

With reference still to FIG. 4, in some embodiments, some of the plurality of elements 110 may extend outwardly a radial distance R1 from an axis A of connector 170 that is greater than an outer radial distance R2 of spacer 160 from axis A. As shown in FIG. 3, in some embodiments, spacer 160 may have a first longitudinal length L1 along axis A of connector 170 (FIG. 4), and plurality of elements 110 disposed between spacers 160 may extend along a second longitudinal length L2 along axis A. For example, first longitudinal length L1 may be equal to second longitudinal length L2. In other embodiments, first longitudinal length L1 may be between about 30 percent and 70 percent of second longitudinal length L2. In a similar manner, in some embodiments, separators 190 may have a longitudinal length L3 along axis A of connector 170 (FIG. 4), and plurality of elements 110 disposed between separators 190 may extend along a longitudinal length L1 along axis A. Longitudinal length L3 may be equal to longitudinal length L2. In other embodiments, longitudinal length L3 may be between about 30 percent and 70 percent of longitudinal length L2. In other embodiments as shown in FIGS. 3 and 4, first longitudinal length L1 and longitudinal length L3 may be greater than second longitudinal length L2.

As illustrated, lighting fixture pendant 100 includes asymmetrically disposed elements, e.g., the octagonal-shaped faceted crystals, but in which the lighting fixture pendant retains a general overall vertical orientation. The asymmetrically disposed octagonal-shaped faceted crystals may be rotated about a vertical axis. For example, the asymmetrically disposed octagonal-shaped faceted crystals may be rotatable in the direction of double-headed arrow R (FIG. 4) about longitudinal axis A (FIG. 4). The combination of spacer 160 and beads 140 aid in aligning the lighting fixture pendant along the longitudinal axis A (FIG. 4) of connector 170 (FIG. 4). The present technique allows for a generally aligned vertical arrangement, while allowing variation lengthwise in the appearance of the disposed crystals.

Figure 5:
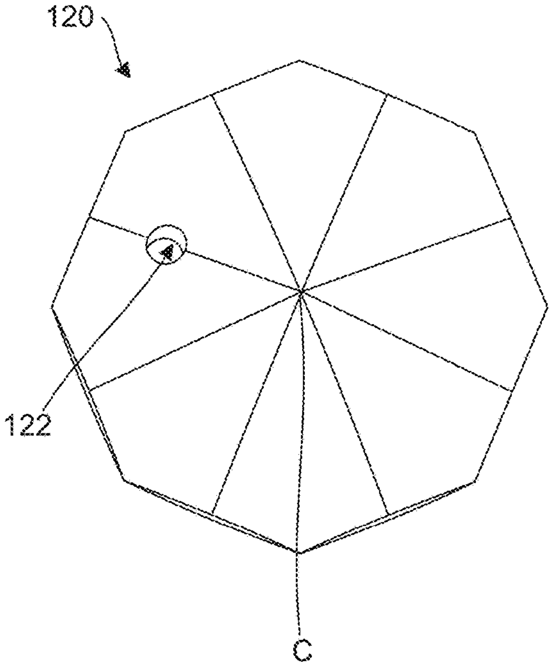
FIG. 5 is an enlarged perspective view of one of the large octagonal-shaped faceted crystals of lighting fixture pendant of FIGS. 3 and 4, according to an embodiment of the present disclosure.

FIG. 5 illustrates one of the large octagonal-shaped faceted crystals 120 having an aperture 122 offset from the center C of the octagon crystal, according to an embodiment of the present disclosure.

Figure 6:
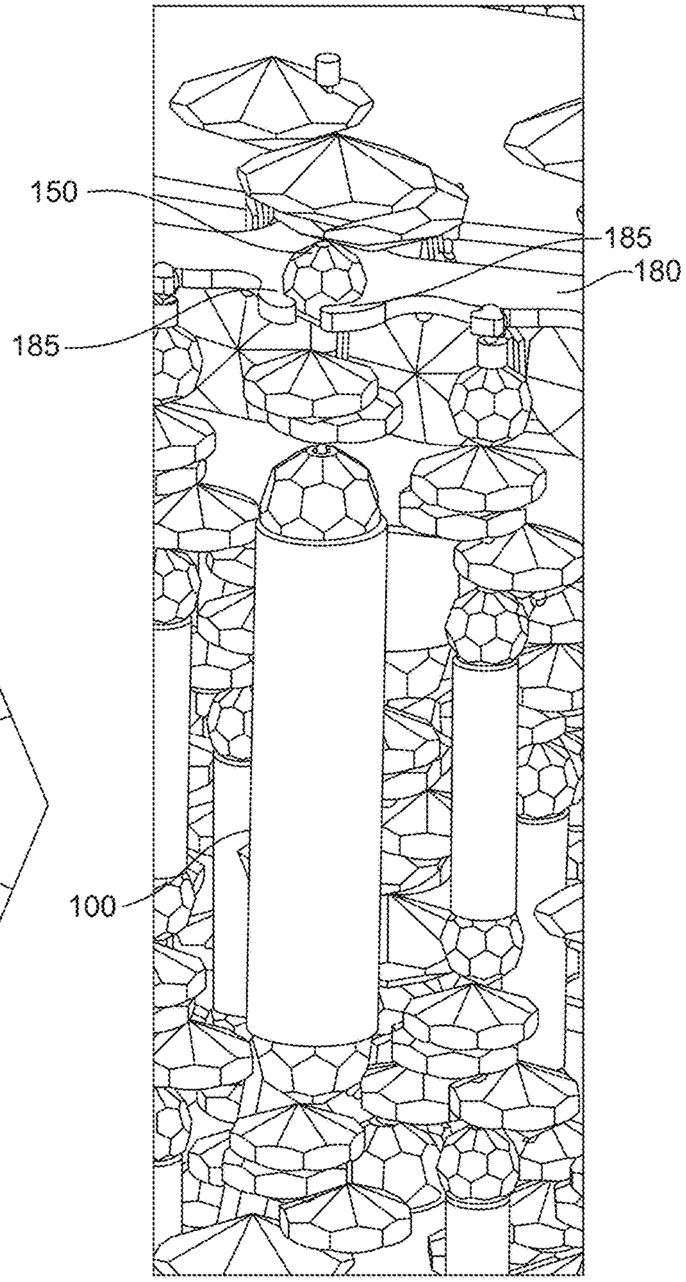
FIG. 6 is a perspective view of the lighting fixture pendant of FIGS. 3 and 4 supported from a gallery plate, according to an embodiment of the present disclosure.

As shown in FIG. 6, lighting fixture pendant 100 may be supported from a gallery plate 180, according to an embodiment of the present disclosure. For example, small bead 150 may be supported between a pair of fingers 185 of gallery plate 180. In this illustrates arrangement, a portion of the lighting fixture pendant 100 may be disposed above gallery plate 180 with the remainder of the lighting fixture pendant hanging below.

Figure 7:
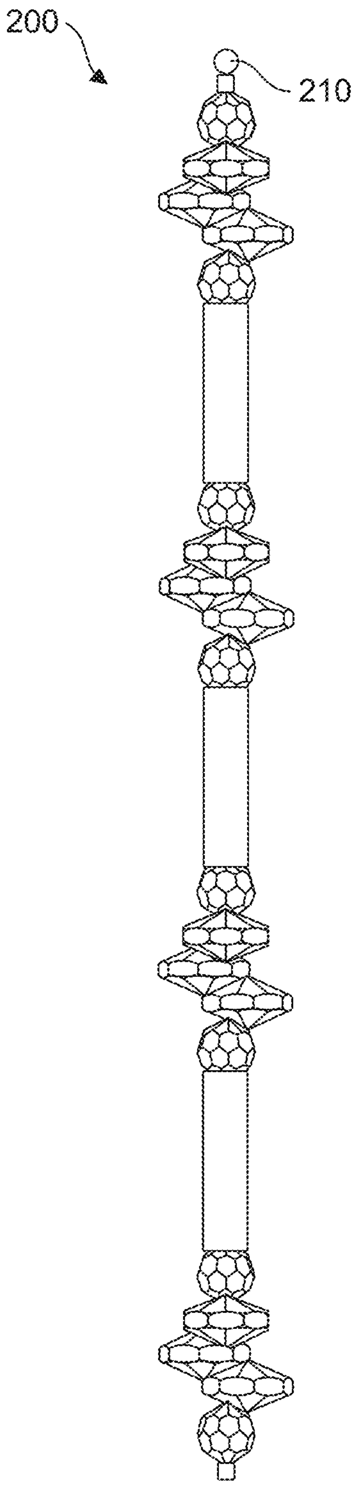
FIG. 7 is a side elevational view of a lighting fixture pendant, according to an embodiment of the present disclosure.
Figure 8:
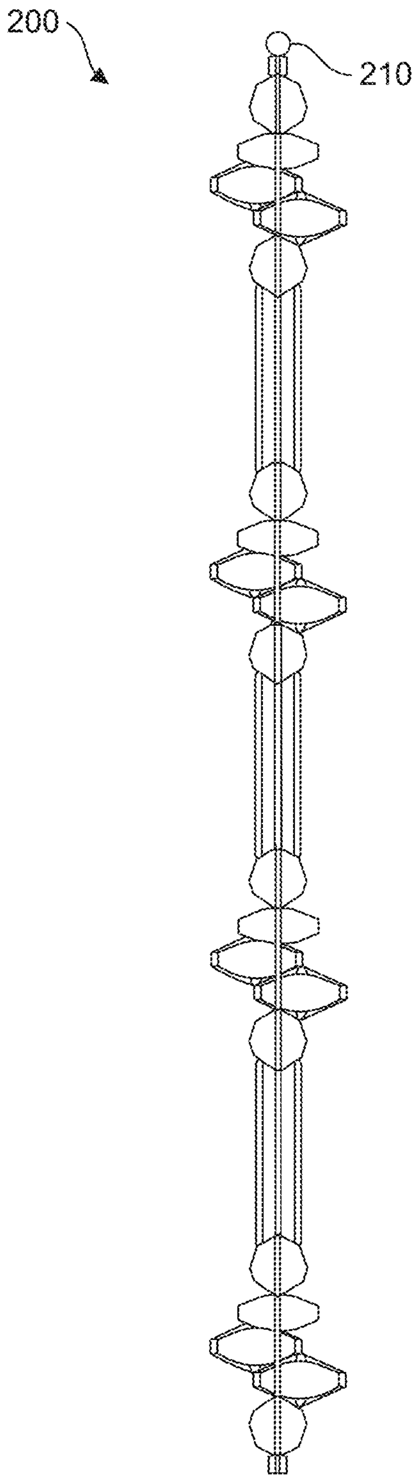
FIG. 8 is a cross-sectional view of the lighting fixture pendant of FIG. 7, according to an embodiment of the present disclosure.

FIGS. 7 and 8 illustrate a lighting fixture pendant 200, according to an embodiment of the present disclosure. Lighting fixture pendant 200 may be assembled from similar components as lighting fixture pendant 100. In this illustrated embodiment, an upper end of lighting fixture pendant 200 may be provided with a ring 210.

Figure 9:
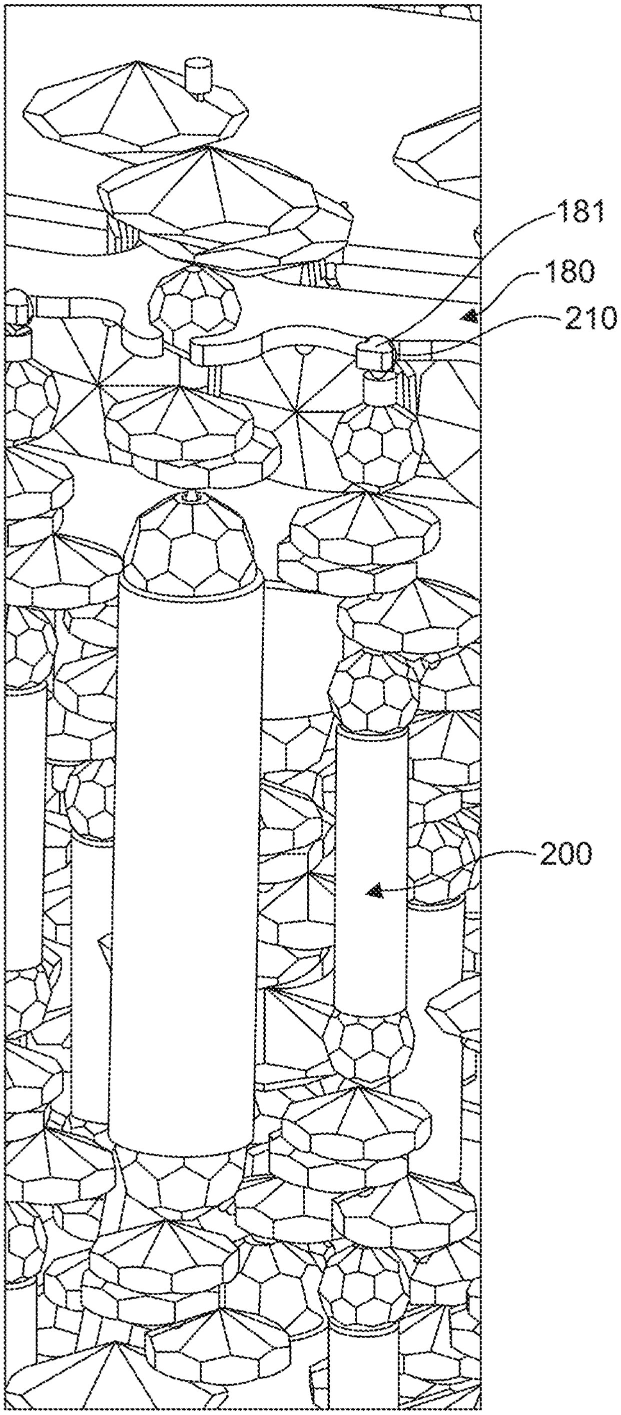
FIG. 9 is a perspective view of the lighting fixture pendant of FIGS. 7 and 8 supported from a gallery plate, according to an embodiment of the present disclosure.

As shown in FIG. 9, lighting fixture pendant 200 may be supported from gallery plate 180, according to an embodiment of the present disclosure. For example, ring 210 may be placed over and supported on a horizontally disposed T-shaped post 181 of gallery plate 180.

As shown in FIGS. 3, 4, 7, and 8, at least some of the plurality of asymmetric elements may have corresponding adjacent mating angled surfaces relative to the axis of the wire cable or other elongated member so that the asymmetric elements are nested or otherwise fit compactly together along the axis of the cable, wire, or other elongated member. In other embodiments, the asymmetrically disposed may have flat surfaces that fit compactly together.

It will be appreciated that the lighting fixture pendants of the present disclosure may include any one of a myriad of components, elements, crystals, ornaments, and/or related hardware, in any number or arrangement. The hollow cylinder or tube may have other configurations such as a hollow square tube. The separators, and spacers such as beads and tubes may have other configurations that allow for a self-aligning feature. The size and shape of components, elements, crystals, ornaments, and/or related hardware may vary, for instance, depending upon the visual effect desired, among other things. From the present disclosure, the elements may be made of crystals or other materials.

As may be recognized by those of ordinary skill in the art based on the teachings herein, numerous changes and modifications may be made to the above-described and other embodiments of the present disclosure without departing from the scope of the disclosure. The components of the lighting fixture pendants or ornamental trim or chains as disclosed in the specification, including the accompanying abstract and drawings, may be replaced by alternative component(s) or feature(s), such as those disclosed in another embodiment, which serve the same, equivalent or similar purpose as known by those skilled in the art to achieve the same, equivalent or similar results by such alternative component(s) or feature(s) to provide a similar function for the intended purpose. In addition, the lighting fixture pendants or ornamental trim or chains may include more or fewer components or features than the embodiments as described and illustrated herein. Accordingly, this detailed description of the currently preferred embodiments is to be taken in an illustrative, as opposed to limiting of the disclosure.

The terminology used herein is for the purpose of describing particular embodiments only and is not intended to be limiting of the disclosure. As used herein, the singular forms “a”, “an” and “the” are intended to include the plural forms as well, unless the context clearly indicates otherwise. It will be further understood that the terms "comprise" (and any form of comprise, such as "comprises" and "comprising"), "have" (and any form of have, such as "has", and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The disclosure has been described with reference to the preferred embodiments. It will be understood that the embodiments described herein are exemplary of a plurality of possible arrangements to provide the same general features, characteristics, and general system operation. Modifications and alterations will occur to others upon a reading and understanding of the preceding detailed description. It is intended that the disclosure be construed as including all such modifications and alterations.

The invention claimed is:

1. A lighting fixture pendant comprising:

a connector having a first end and a second end, the connector defining an axis between the first end and the second end of the connector;

a first plurality of elements having an aperture therethrough and having portions asymmetrically disposed around the aperture;

a second plurality of elements having an aperture therethrough and having portions asymmetrically disposed around the aperture;

at least one spacer having a first end and a second end, and a passageway extending from the first end to the second end of the spacer;

a first body having an aperture therethrough; and a second body having an aperture therethrough;

wherein:

the connector extends through the apertures of the first plurality of elements, the second plurality of elements, the apertures of the first body and the second body, and the passageway of the spacer;

the first body is proximate to the first end of the spacer and the second body is proximate to the second end of the spacer;

the first plurality of elements comprises a first element and a second element, without an intervening spacer, disposed proximate to the first body;

the second plurality of elements comprises a first element and a second element, without an intervening spacer, disposed proximate to the second body;

when the lighting fixture pendant is supported from the first end of the connector, the first plurality of elements, the second plurality of elements, the first body, the second body, and the spacer are vertically aligned along the axis; and the first element and the second element of the first plurality of elements extend in different directions radially outwardly from the axis, and the first element and the second element of the second plurality of elements extend in different directions radially outwardly from the axis.

2. The lighting fixture pendant of claim 1 wherein:

the connector comprises a wire or a cable;

the plurality of elements comprises a plurality of ornamental elements; and the at least one spacer comprises a symmetric spacer.

3. The lighting fixture pendant of claim 1 wherein:

the connector comprises a wire or a cable;

at least some of the plurality of elements are faceted elements;

the at least one spacer comprises a tube;

the first body comprises a first bead; and the second body comprises a second bead.

4. The lighting fixture pendant of claim 3, wherein the faceted elements, the first bead and the second bead are crystals.

5. The lighting fixture pendant of claim 1, wherein some of the plurality of elements have mating surfaces, which mating surfaces are angled relative to the axis.

6. The lighting fixture pendant of claim 1 wherein:

the spacer extends outwardly a first radial distance from the axis;

at least some of the plurality of elements extend outwardly a second radial distance from the axis; and the second radial distance is greater than the first radial distance.

7. The lighting fixture pendant of claim 1 wherein:

the spacer comprises a first longitudinal length along the axis;

the plurality of elements extend along a second longitudinal length along the axis; and the first longitudinal length is between 30 percent and 70 percent of the second longitudinal length.

8. The lighting fixture pendant of claim 1 wherein:

the spacer comprises a first longitudinal length along the axis;

the plurality of elements extend along a second longitudinal length along the axis; and the first longitudinal length is greater than the second longitudinal length.

9. The lighting fixture pendant of claim 1 wherein:

the connector comprises a flexible wire or cable; and the plurality of elements and the spacer are loosely supported on the connector between the first end and the second end of the connector.

10. The lighting fixture pendant of claim 9 wherein:

the plurality of elements is rotatable about the connector.

11. A lighting fixture comprising:

a support;

a lighting fixture pendant of claim 1 supportable from the support; and a light source.

12. A lighting fixture comprising:

a support;

a lighting fixture pendant of claim 2 supportable from the support; and a light source.

13. A lighting fixture comprising:

a support;

a lighting fixture pendant of claim 4 supportable from the support; and a light source.

14. A lighting fixture comprising:

a support;

a lighting fixture pendant of claim 10 supportable from the support; and a light source.

15. A lighting fixture pendant comprising:
a connector having a first end and a second end, the connector defining an axis between the first end and the second end of the connector;
a first plurality of elements having an aperture therethrough and having portions asymmetrically disposed around the aperture;
a second plurality of elements having an aperture therethrough and having portions asymmetrically disposed around the aperture; and
at least one separator having a first end and a second end, and a passageway extending from the first end to the second end of the separator;
wherein:
the connector extends through the apertures of the first plurality of elements, the second plurality of elements, and the passageway of the separator;
the first plurality of elements comprises a first element and a second element, without an intervening separator, disposed above the at least one separator;
the second plurality of elements comprises a first element and a second element, without an intervening separator, disposed below the at least one separator;
when the lighting fixture pendant is supported from the first end of the connector, the first plurality of elements, the second plurality of elements, and the separator are vertically aligned along the axis; and
the first element and the second element of the first plurality of elements extend in different directions radially outwardly from the axis, and the first element and the second element of the second plurality of elements extend in different directions radially outwardly from the axis.

16. The lighting fixture pendant of claim 15 wherein:
the connector comprises a wire or a cable;
the plurality of elements comprises a plurality of ornamental elements; and
the at least one separator comprises a symmetric separator.

17. The lighting fixture pendant of claim 15 wherein:
the connector comprises a wire or a cable;
the plurality of elements comprises a plurality of faceted crystals; and
the at least one separator comprises:
a tube;
a first bead; and
a second bead.

18. The lighting fixture pendant of claim 17 wherein:
the separator extends outwardly a first radial distance from the axis;
at least some of the plurality of elements extends outwardly a second radial distance from the axis; and
the second radial distance is greater than the first radial distance.

19. The lighting fixture pendant of claim 15, wherein some of the plurality of elements have mating surfaces, which mating surfaces are angled relative to the axis.

20. The lighting fixture pendant of claim 15 wherein:
the separator comprises a first longitudinal length along the axis;
the plurality of elements extends along a second longitudinal length along the axis; and
wherein the first longitudinal length is between 30 percent and 70 percent of the second longitudinal length.

21. The lighting fixture pendant of claim 15 wherein:
the separator comprises a first longitudinal length along the axis;
the plurality of elements extend along a second longitudinal length along the axis; and
the first longitudinal length is greater than the second longitudinal length.

22. The lighting fixture pendant of claim 15 wherein:
the connector comprises a flexible wire or cable; and
the plurality of elements and the separator are loosely supported on the connector between the first end and the second end of the connector.

23. The lighting fixture pendant of claim 22 wherein:
the plurality of elements is rotatable about the connector.

24. The lighting fixture pendant of claim 15 wherein:
the separator comprises a monolithic separator.

25. The lighting fixture pendant of claim 15 wherein:
the separator comprises a first separator and a second separator; and
at least some of the plurality of elements are disposed between the first separator and the second separator.

26. A lighting fixture comprising:
a support;
a lighting fixture pendant of claim 15 supportable from the support; and
a light source.

27. A lighting fixture comprising:
a support;
a lighting fixture pendant of claim 16 supportable from the support; and
a light source.

28. A lighting fixture comprising:
a support;
a lighting fixture pendant of claim 17 supportable from the support; and
a light source.

29. A lighting fixture comprising:
a support;
a lighting fixture pendant of claim 23 supportable from the support; and
a light source.

* * * * *